United States Patent [19]

Wade et al.

[11] Patent Number: 5,580,945
[45] Date of Patent: Dec. 3, 1996

[54] POLYUREA COATINGS COMPOSITIONS AND COATING HAVING IMPROVED FLEXIBILITY

[75] Inventors: Robert A. Wade, Carnegie, Pa.; Terrell D. Wayt, Moundsville, W. Va.

[73] Assignee: Bayer Corporation, Pittsburgh, Pa.

[21] Appl. No.: 346,596

[22] Filed: Nov. 29, 1994

[51] Int. Cl.$^6$ .............................. C08G 18/16; C08G 18/34
[52] U.S. Cl. ................. 528/49; 528/68; 528/84; 525/452; 524/773
[58] Field of Search .................. 528/68, 84, 49; 525/452; 524/773

[56] References Cited

U.S. PATENT DOCUMENTS

| | | | |
|---|---|---|---|
| 3,549,599 | 12/1970 | Merten et al. | 528/73 |
| 4,089,860 | 5/1978 | Merten et al. | 525/455 |
| 5,126,170 | 6/1992 | Zwiener et al. | 427/385.5 |

FOREIGN PATENT DOCUMENTS 2158945  5/1973  Germany.

*Primary Examiner*—Rachel Johnson
*Attorney, Agent, or Firm*—Joseph C. Gil; Thomas W. Roy

[57] ABSTRACT

The present invention relates to a coating composition for the preparation of a polyurea coating which contains a) a polyisocyanate component containing one or more aliphatic polyisocyanates, b) at least one polaspartic acid ester c) 0.05 to 5% by weight, based on the total weight of the coating composition, of an organic acid, wherein components a) and b) are present in amounts sufficient to provide an equivalent ratio of isocyanate groups of component a) to isocyanate-reactive groups of component b) of 0.5:1 to 20:1.

19 Claims, No Drawings

POLYUREA COATINGS COMPOSITIONS AND COATING HAVING IMPROVED FLEXIBILITY

BACKGROUND OF THE INVENTION

1. Field of the Invention

This present invention relates to coating compositions containing polyisocyanates, polyaspartates and organic acids, which may be rapidly cured to provide coatings which have improved flexibility.

2. Description of the Prior Art

Two-component coating compositions containing, as binders, polyisocyanates in combination with polyaspartates containing secondary amino groups are known and disclosed in U.S. Pat. No. 5,126,170 and also DE-OS 2,158,945. They are suitable for the formation of high quality coatings and can be adjusted to produce coatings which are hard, elastic, abrasion resistant, solvent resistant and especially weather resistant. A disadvantage of these systems is that the coatings are not suitable for applications which require a high degree of flexibility.

Accordingly, it is an object of the present invention to provide coatings having increased flexibility. This object may be achieved with the coating compositions of the present invention which contain organic acids in addition to the polyisocyanates and polyaspartates. It is surprising that the addition of an organic acid would have any affect on the flexibility of the coating composition since the reaction product of the polyisocyanate and polyaspartate would be expected to be the same regardless of the presence of the organic acid.

SUMMARY OF THE INVENTION

The present invention relates to a coating composition for the preparation of a polyurea coating which contains
a) a polyisocyanate component containing one or more aliphatic polyisocyanates,
b) at least one compound corresponding to the formula

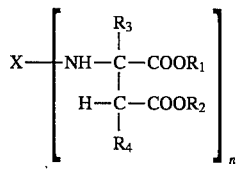

wherein
X represents an organic group which has a valency of n, is inert towards isocyanate groups at a temperature of 100° C. or less and is obtained by the removal of the amino groups from an aliphatic polyamine,
$R_1$ and $R_2$ may be identical or different and represent organic groups which are inert towards isocyanate groups at a temperature of 100° C. or less,
$R_3$ and $R_4$ may be identical or different and represent hydrogen or organic groups which are inert towards isocyanate groups at a temperature of 100° C. or less and
n represents an integer with a value of at least 2, and
c) 0.01 to 5% by weight, based on the total weight of the coating composition, of an organic acid.

DETAILED DESCRIPTION OF THE INVENTION

In accordance with the present invention a "polyurea" is understood to mean a polymer containing urea groups and optionally other groups such as urethane groups.

Examples of suitable aliphatic polyisocyanates, i.e. polyisocyanates containing aliphatically bound isocyanate groups, which may be used as polyisocyanate component a) in accordance with the present invention include monomeric diisocyanates, preferably NCO prepolymers and more preferably polyisocyanate adducts. Suitable monomeric diisocyanates may be represented by the formula

in which R represents an organic group obtained by removing the isocyanate groups from an aliphatic hydrocarbon group, preferably having 4 to 18 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate and mixture thereof. 1,6-hexamethylene diisocyanate is especially preferred.

In accordance with the present invention the polyisocyanate component is preferably in the form of an NCO prepolymer or a polyisocyanate adduct, more preferably a polyisocyanate adduct. Suitable polyisocyanate adducts are those containing isocyanurate, uretdione, biuret, urethane, allophanate, carbodiimide and/or oxadiazinetrione groups. The polyisocyanates adducts have an average functionality of 2 to 6 and an NCO content of 5 to 30% by weight.

1) Isocyanurate group-containing polyisocyanates which may be prepared as set forth in DE-PS 2,616,416, EP-OS 3,765, EP-OS 10,589, EP-OS 47,452, U.S. Pat. No. 4,288, 586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a trialkyl phosphine catalyst and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906, 126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos. 5,124,427, 5,208,334 and 5,235,018; the disclosures of which are herein incorporated by reference.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

8) Polyisocyanates containing oxadiazinetrione groups and containing the reaction product of two moles of a diisocyanate and one mole of carbon dioxide.

Preferred polyisocyanate adducts are the polyisocyanates containing isocyanurate groups, biuret groups or mixtures of isocyanurate and allophanate groups.

The NCO prepolymers, which may also be used as the polyisocyanate component in accordance with the present invention, are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 400 to about 6,000, preferably 800 to about 3,000, and optionally low molecular weight compounds with molecular weights below 400. The molecular weights are number average molecular weights ($M_n$) and are determined by end group analysis (OH number). Products obtained by reacting polyisocyanates exclusively with low molecular weight compounds are polyisocyanates adducts containing urethane groups and are not considered to be NCO prepolymers.

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred. Further details concerning the low molecular weight compounds and the starting materials and methods for preparing the high molecular weight polyhydroxy compounds are disclosed in U.S. Pat. No. 4,701,480, herein incorporated by reference.

These NCO prepolymers generally have an isocyanate content of about 0.5 to 30% by weight, preferably about 1 to 20% by weight, and are prepared in known manner by the reaction of the above mentioned starting materials at an NCO/OH equivalent ratio of about 1.05:1 to 10:1 preferably about 1.1:1 to 3:1. This reaction may take place in a suitable solvent which may optionally be removed by distillation after the reaction along with any unreacted volatile starting polyisocyanates still present. In accordance with the present invention NCO prepolymers also include NCO semi-prepolymers which contain unreacted starting polyisocyanates in addition to the urethane group-containing prepolymers.

Component b) contains at least one compound corresponding to the formula:

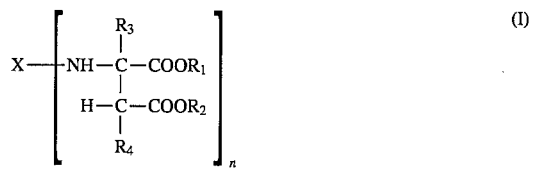

wherein

X represents an organic group which has a valency of n, is inert towards isocyanate groups at a temperature of 100° C. or less and is obtained by the removal of the amino groups from an aliphatic polyamine, preferably a diamine, $R_1$ and $R_2$ may be identical or different and represent organic groups which are inert towards isocyanate groups at a temperature of 100° C. or less, preferably methyl, ethyl or butyl groups, $R_3$ and $R_4$ may be identical or different and represent hydrogen or organic groups which are inert towards isocyanate groups at a temperature of 100° C. or less, preferably hydrogen and n represents an integer with a value of at least 2, preferably 2 to 4 and more preferably 2.

These compounds are prepared in known manner by reacting the corresponding primary polyamines corresponding to the formula

with optionally substituted maleic or fumaric acid esters corresponding to the formula

Suitable polyamines include ethylene diamine, 1,2-diaminopropane, 1,4-diaminobutane, 1,3-diaminopentane, 2-methyl-1,5-diaminopentane, 1,6-diaminohexane, 2,5-diamino-2,5-dimethylhexane, 2,2,4-and/or 2,4,4-trimethyl-1,6-diaminohexane, 1,11-diaminoundecane, 1,12-diaminododecane. Also suitable are relatively high molecular weight polyether polyamines containing aliphatically bound primary amino groups, for example, the products marketed under the Jeffamine trademark by Texaco. Preferred polyamines are 1,4-diaminobutane, 2-methyl-1,5-diaminopentane, 1,6-diaminohexane, 2,2,4- and 2,4,4-trimethyl-1,6-diaminohexane. 2-methyl-1,5-diaminopentane is especially preferred.

Examples of optionally substituted maleic or fumaric acid esters suitable for use in the preparation of the compounds corresponding to formula I include dimethyl, diethyl and dibutyl (e.g., di-n-butyl) esters of maleic acid and fumaric acid and the corresponding maleic or fumaric acid esters substituted by methyl in the 2- and/or 3-position.

The preparation of the "polyaspartic acid derivatives" corresponding to formula I from the above mentioned starting materials may be carried out, for example, at a temperature of 0° to 100° C. using the starting materials in such proportions that at least 1, preferably 1, olefinic double bond is present for each primary amino group. Excess starting materials may be removed by distillation after the reaction. The reaction may be carried out solvent-free or in the presence of suitable solvents such as methanol, ethanol, propanol, dioxane and mixtures of such solvents.

Suitable organic acids c) include the known carboxylic acids, preferably monocarboxylic acids containing 1 to 40 carbon atoms, preferably 2 to 24 carbon atoms and more preferably 2 to 12 carbon atoms. The acids may be aliphatic, cycloaliphatic, aromatic or araliphatic. The acids are added to the coating compositions in an amount of 0.01 to 5% by weight, preferably 0.05 to 3% by weight and more preferably 0.1 to 2% by weight, based on the total weight of the coating composition. Examples of suitable organic acids include the isomeric propionic acids, butanoic acids, pentanoic acids, hexanoic acids, octanoic acids, 2-ethyl hexanoic acids, decanoic acids, dodecanoic acids, cyclohexanoic acids and the known fatty acids. Especially preferred is octanoic acid.

The binders present in the coating compositions according to the invention contain polyisocyanate component a), at least one secondary polyamine b) corresponding to formula I and organic acid c). While component b) may also contain other isocyanate-reactive components, such as the polyols commonly used in polyurethane coating compositions, their presence is not preferred. Components a) and b) are used in amounts sufficient to provide an equivalent ratio of isocyanate groups to isocyanate-reactive groups of about 0.8:1 to 20:1, preferably about 0.8:1 to 2.1 and more preferably about 0.8:1 to 1.5:1.

The binders to be used according to the invention are prepared by mixing all of the individual components together or by premixing two of the components before adding the third component. For example, organic acid c) may be initially blended with component a) or component b) before the addition of the other component.

Preparation of the binders is carried out solvent-free or in the presence of the solvents conventionally used in polyurethane or polyurea coatings. It is an advantage of the process according to the invention that the quantity of solvent used may be greatly reduced when compared with that required in conventional two-component systems containing polyisocyanates and organic polyols.

Examples of suitable solvents include xylene, butyl acetate, methyl isobutyl ketone, methoxypropyl acetate, N-methyl pyrrolidone, Solvesso solvent, petroleum hydrocarbons, isobutanol, butyl glycol, chlorobenzenes and mixtures of such solvents.

In the coating compositions to be used for the process according to the invention, the ratio by weight of the total quantity of binder components a) and b) to the quantity of solvent is about 40:60 to 100:0, preferably about 60:40 to 100:0.

The coating compositions to be used for the process according to the invention may also contain other auxiliary agents and additives conventionally used in polyurethane and polyurea coatings, in particular, catalysts, pigments, fillers, levelling agents, antisettling agents, UV stabilizers and the like.

The properties of the coatings obtained by the process according to the invention may be adjusted, in particular by suitable choice of the nature and proportions of the starting components a) and b). In addition, the flexibility of the resulting coatings may be increased by using greater amounts of organic acid c). In general, as the amount of component c) increases, the flexibility of the resulting coatings increases up to a certain point.

To prepare coatings, the coating compositions according to the invention are applied as one or more layers to substrates by known methods such as spraying, brush coating, immersion or flooding or by means of rollers or doctor applicators. The coating compositions according to the invention are suitable for the formation of coatings on various substrates, e.g., metals, plastics, wood, cement, concrete or glass. The coating compositions are particularly suitable for the formation of coatings on sheet steel, for example, for the manufacture of car bodies, machine trim panels, vats or containers. The coating compositions are also suitable for the production of roofing coatings, especially in view of the increased flexibility of these coatings due to the presence of organic acids c). The substrates to be coated by the process according to the invention may be treated with suitable primers before the process according to the invention is carried out.

After the substrates exemplified above have been coated, the coatings may be cured at either ambient temperature, e.g., by air drying or so-called forced drying, or at elevated temperature. It is of great benefit that the coatings will not thermally degrade even at the higher temperatures which may occur in the event of a breakdown of the coatings plant.

The improvement in flexibility which may be obtained when using the coating compositions according to the invention is demonstrated in the examples which follow. All parts and percentages given are by weight unless otherwise indicated.

EXAMPLES

The following starting materials were used in the examples:

Polyisocyanate 1

An isocyanurate group-containing polyisocyanate prepared by trimerizing a portion of the isocyanate groups of 1,6-hexamethylene diisocyanate and having an isocyanate content of 21.6%, a content of monomeric diisocyanate of <0.2%, a viscosity at 20° C. of 3000 mPa.s.

Polyisocyanate 2

A semi-prepolymer containing aromatically bound isocyanate groups and available from Miles as Desmodur XP-743.

Polyisocyanate 3

An isocyanurate group-containing polyisocyanate present as a 70% solution in a 1:1 blend of propylene glycol monomethyl ether acetate and xylene and prepared by trimerizing a portion of the isocyanate groups of isophorone diisocyanate, wherein the solution has an isocyanate content of 11.7%, a content of monomeric diisocyanate of <0.5%, a viscosity at 20° C. of 1300 to 2700 mPa.s.

Polyaspartic Acid Ester 1 (PAE 1)

PAE 1 was prepared by charging two moles of diethyl maleate to a 3-necked round bottom flask containing a mechanical stirrer, thermometer and an addition funnel. To the stirred diethyl maleate at 25° C. under a nitrogen atmosphere was added portion wise one mole of 2-methyl-1,5-pentane diamine so as to maintain a reaction temperature of 50° C. or less using an ice water cooling bath, if necessary. At the completion of diamine addition the reaction temperature was maintained at 50° C. until no diethyl maleate was present in the reaction mixture as determined by TLC. The crude reaction mixture was cooled to room temperature and poured into a container and sealed.

Polyaspartic Acid Ester 2 (PAE 2)

PAE 2 was prepared following the procedure set forth for PAE 1 with the exception that bis-(4-amino-2-methyl-cyclohexyl)-methane was used in place of 2-methyl-1,5-pentane diamine.

Examples 1–2

Polyisocyanate 1 and PAE 1 were blended at an NCO/NH equivalent ratio of 1.1:1.0 and optionally mixed with octanoic acid. The amounts of the components are set forth in Table 1. The resulting mixtures were poured into aluminum pans having a diameter of about 50 mm and allowed to cure for 5 days at room temperature. The Shore D hardness of the resulting samples, having a thickness of about 12.5 mm, was tested by averaging readings taken at 5 different locations on the surface of each sample. The results are set forth in Table 1.

TABLE 1

| | Amount | | | Shore D Hardness | |
|---|---|---|---|---|---|
| Example | Polyisocyanate | PAE 1 | Octanoic Acid | Top | Bottom |
| 1 | 43.0 | 46.0 | 0.8 | 15 | 15 |
| 2 (Comp) | 43.0 | 46.0 | 0 | 78 | 78 |

The results demonstrate the improved flexibility of the samples containing octanoic acid in accordance with the present invention.

Examples 3–4

To demonstrate the improvement in flexibility in thinner samples, i.e., mixtures were prepared as in Example 1 and were then drawndown on glass at a wet film thickness of 10 mils. The films were cured for 4 days at room temperature, removed from the glass by immersing in water then placed in a oven for 30 min at 60° C. The 2% secant modulus was then measured on an Instrom instrument at a crosshead speed of 0.5 mm/min. The results are set forth in Table 2.

TABLE 2

| | Amount | | | |
|---|---|---|---|---|
| Example | Polyisocyanate | PAE 1 | Octanoic Acid | 2% Secant Modulus (psi) |
| 3 | 43.0 | 46.0 | 0.8 | 12,350 |
| 4 (Comp) | 43.0 | 46.0 | 0 | 215,700 |

Examples 5–9

Polyisocyanate 1 and PAE 1 were blended at an NCO/NH equivalent ratio of 1.05:1.0 and mixed with octanoic acid in the percentages set forth in Table 3. The percentages are based on the total weight of the coating composition. The resulting mixtures were poured into aluminum pans having a diameter of about 5 cm and allowed to cure for 33 days at room temperature. The Shore A and D hardnesses of the resulting samples, having a thickness of at least 9 mm, were tested by averaging readings taken at 5 different locations on the surface of each sample. The results are set forth in Table 3.

TABLE 3

| | | Shore Hardness | |
|---|---|---|---|
| Example | % Acid | A | D |
| 5 (Comp) | 0 | >100 | 82 |
| 6 | 0.1 | 82 | 22 |
| 7 | 0.5 | 72 | 18 |
| 8 | 1.0 | 72 | 17 |
| 9 | 2.0 | 70 | 16 |

These results demonstrate that it is possible to obtain improvements in flexibility with varying amounts of the octanoic acid.

Examples 10–14—Comparisons

Polyisocyanate 1 and PAE 2 were blended at an NCO/NH equivalent ratio of 1.05:1.0 and mixed with octanoic acid in the percentages set forth in Table 4. The percentages are based on the total weight of the coating composition. The resulting mixtures were poured into aluminum pans having a diameter of about 5 cm and allowed to cure at room temperature. The Shore D hardness of the resulting samples, having a thickness of 6.5 to 9 mm, was tested by averaging readings taken at 5 different locations on the surface of each sample after the times set forth in Table 4. The results are set forth in Table 4.

TABLE 4

| | | Shore D Hardness | | | | | |
|---|---|---|---|---|---|---|---|
| | % | 1 Day | | 18/24 5 Days | | 18 Days | |
| Example | Acid | Top | Bottom | Top | Bottom | Top | Bottom |
| 10 (Comp) | 0 | 77 | 81 | 79 | 83 | 79 | 83 |
| 11 (Comp) | 0.1 | 78 | 81 | 80 | 83 | 81 | 82 |
| 12 (Comp) | 0.3 | 77 | 80 | 79 | 82 | 78 | 81 |
| 13 (Comp) | 0.5 | 77 | 81 | 79 | 82 | 78 | 81 |
| 14 (Comp) | 1.0 | 78 | 81 | 80 | 82 | 77 | 80 |

These results demonstrate that the improvement in flexibility is not obtained with aspartates prepared from cycloaliphatic polyamines. To obtain this improvement it is necessary to use aspartates prepared from aliphatic polyamines.

Examples 15–19

Polyisocyanate 1 and PAE 1 were blended at an NCO/NH equivalent ratio of 1.1:1.0 and optionally mixed with hexanoic or octanoic acid in the percentages set forth in Table 5. The percentages are based on the total weight of the coating composition. The resulting mixtures were poured into aluminum pans having a diameter of about 5 cm and allowed to cure at room temperature. The Shore D hardness of the resulting samples, having a thickness of about 6.5 mm, was tested by averaging readings taken at 5 different locations on the surface of each sample after the times set forth in Table 5. The results are set forth in Table 5.

TABLE 5

| | | | Shore D Hardness | | | | | |
|---|---|---|---|---|---|---|---|---|
| | | | 1.5 Hours | | 5 Hours | | 6 Days | |
| Example | Acid | % Acid | Top | Bottom | Top | Bottom | Top | Bottom |
| 15 (Comp) | None | 0 | 79 | 80 | 80 | 80 | 81 | 81 |
| 16 | Hexanoic | 0.5 | 33 | 75 | 25 | 74 | 18 | 16 |
| 17 | Hexanoic | 1.0 | 20 | 31 | 22 | 20 | 20 | 15 |
| 18 | Octanoic | 0.5 | 38 | 74 | 28 | 76 | 20 | 17 |
| 19 | Octanoic | 1.0 | 20 | 40 | 30 | 32 | 19 | 15 |

These results demonstrate that the improvement in flexibility may be obtained with acids other than octanoic acid.

Examples 20–24—Comparisons

Either Polyisocyanate 2 or Polyisocyanate 3 was blended with PAE 1 at an NCO/NH equivalent ratio of 1.1:1.0 and optionally mixed with octanoic acid. The amounts of the components are set forth in Table 6.

TABLE 6

| Example | Polyiso-cyanate 2 | Polyiso-cyanate 3 | PAE 1 | Octanoic Acid |
|---|---|---|---|---|
| 20 (Comp) | 33.8 | | 13.4 | 0 |
| 21 (Comp) | 33.8 | | 13.4 | 0.14 |
| 22 (Comp) | | 34.9 | 20.0 | 0 |
| 23 (Comp) | | 34.9 | 20.0 | 0.13 |
| 24 (Comp) | | 34.9 | 20.0 | 0.35 |

A portion of the resulting mixtures were poured into aluminum pans having a diameter of about 5 cm and allowed to cure at room temperature. The gel time was determined from the remainder of the sample. The Shore A and D hardnesses of the resulting samples, having a thickness of 6.5 to 9 mm, was tested by averaging readings taken at 5 different locations on the surface of each sample after the times set forth in Table 7. The results are set forth in Table 7.

TABLE 7

| | | Shore Hardness | | | | | | | |
|---|---|---|---|---|---|---|---|---|---|
| | Gel Time | 4 Hours | | 24 Hours | | 48 Hours | | 7 Days | |
| Example | (Min) | A | D | A | D | A | D | A | D |
| 20 (Comp) | 0.75 | 85 | 25 | 88 | 27 | 91 | 32 | 94 | 35 |
| 21 (Comp) | 0.42 | 82 | 25 | 85 | 27 | 90 | 30 | 92 | 32 |
| 22 (Comp) | 4.75 | >100 | 67 | >100 | 71 | >100 | 71 | >100 | 75 |
| 23 (Comp) | 2.67 | >100 | 69 | >100 | 70 | >100 | 71 | >100 | 75 |
| 24 (Comp) | 1.67 | >100 | 69 | >100 | 67 | >100 | 70 | >100 | 73 |

These results demonstrate that the improvement in flexibility is not obtained with polyisocyanates having cycloaliphatically or aromatically bound isocyanate groups. To obtain this improvement it is necessary to use polyisocyanates having aliphatically bound isocyanate groups.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition for the preparation of a polyurea coating which comprises
   a) a polyisocyanate component containing one or more aliphatic polyisocyanates,
   b) at least one compound corresponding to the formula

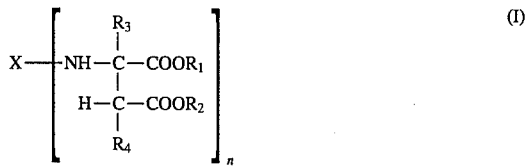

(I)

wherein
   X represents an organic group which has a valency of n, is inert towards isocyanate groups at a temperature of 100° C. or less and is obtained by the removal of the amino groups from an aliphatic polyamine,
   $R_1$ and $R_2$ may be identical or different and represent organic groups which are inert towards isocyanate groups at a temperature of 100° C. or less,
   $R_3$ and $R_4$ may be identical or different and represent hydrogen or organic groups which are inert towards isocyanate groups at a temperature of 100° C. or less, and
   n represents an integer with a value of at least 2, and
   c) 0.01 to 5% by weight, based on the total weight of the coating composition, of an organic acid, wherein components a) and b) are present in amounts sufficient to provide an equivalent ratio of isocyanate groups of component a) to isocyanate-reactive groups of component b) of 0.5:1 to 20:1.

2. The composition of claim 1 wherein $R_1$ and $R_2$ represent a methyl, ethyl or butyl group, $R_3$ and $R_4$ represent hydrogen and n is 2.

3. The composition of claim 1 wherein X represents a group obtained by removing the amino groups from 2-methyl-1,5-diaminopentane.

4. The composition of claim 2 wherein X represents a group obtained by removing the amino groups from 2-methyl-1,5-diaminopentane.

5. The composition of claim 1 wherein the proportions of components a) and b) are calculated to provide an equivalent ratio of isocyanate groups of component a) to isocyanate-reactive groups of component b) of about 0.8:1 to 2:1.

6. The composition of claim 1 wherein component c) comprises an aliphatic acid containing 2 to 12 carbon atoms.

7. A coating composition for the preparation of a polyurea coating which comprises a) a polyisocyanate component containing one or more polyisocyanate adducts based on 1,6-hexamethylene diisocyanate, b) at least one compound corresponding to the formula

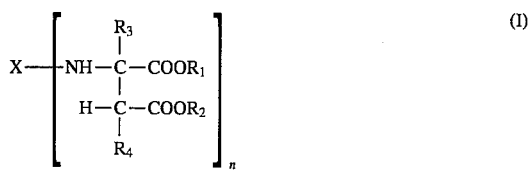

wherein

X represents an organic group which has a valency of n, is inert towards isocyanate groups at a temperature of 100° C. or less and is obtained by the removal of the amino groups from an aliphatic polyamine, $R_1$ and $R_2$ may be identical or different and represent organic groups which are inert towards isocyanate groups at a temperature of 100° C. or less, $R_3$ and $R_4$ may be identical or different and represent hydrogen or organic groups which are inert towards isocyanate groups at a temperature of 100° C. or less, and n represents an integer with a value of at least 2, and c) 0.05 to 3% by weight, based on the total weight of the coating composition, of an organic acid, wherein components a) and b) are present in amounts sufficient to provide an equivalent ratio of isocyanate groups of component a) to isocyanate-reactive groups of component b) of 0.5:1 to 20:1.

8. The composition of claim 7 wherein $R_1$ and $R_2$ represent a methyl, ethyl or butyl group, $R_3$ and $R_4$ represent hydrogen and n is 2.

9. The composition of claim 7 wherein X represents a group obtained by removing the amino groups from 2-methyl-1,5-diaminopentane.

10. The composition of claim 8 wherein X represents a group obtained by removing the amino groups from 2-methyl-1,5-diaminopentane.

11. The composition of claim 7 wherein the proportions of components a) and b) are calculated to provide an equivalent ratio of isocyanate groups of component a) to isocyanate-reactive groups of component b) of about 0.8:1 to 2:1.

12. The composition of claim 7 wherein component c) comprises an aliphatic acid containing 2 to 12 carbon atoms.

13. A coating composition for the preparation of a polyurea coating which comprises a) a polyisocyanate component containing at least one polyisocyanate containing isocyanurate groups and based on 1,6-hexamethylene diisocyanate, b) at least one compound corresponding to the formula

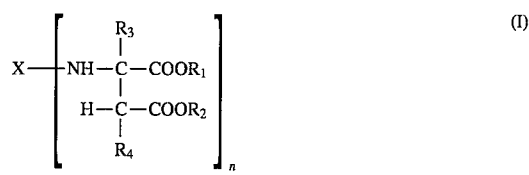

wherein

X represents an organic group which has a valency of n and is inert towards isocyanate groups at a temperature of 100° C. or less, $R_1$ and $R_2$ may be identical or different and represent organic groups which are inert towards isocyanate groups at a temperature of 100° C. or less, $R_3$ and $R_4$ may be identical or different and represent hydrogen or organic groups which are inert towards isocyanate groups at a temperature of 100° C. or less, and n represents an integer with a value of at least 2, and the coating composition additionally contains c) 0.05 to 3% by weight, based on the total weight of the coating composition, of an organic acid, wherein components a) and b) are present in amounts sufficient to provide an equivalent ratio of isocyanate groups of component a) to isocyanate-reactive groups of component b) of 0.5:1 to 20:1.

14. The composition of claim 13 wherein $R_1$ and $R_2$ represent a methyl, ethyl or butyl group, $R_3$ and $R_4$ represent hydrogen and n is 2.

15. The composition of claim 13 wherein X represents a group obtained by removing the amino groups from 2-methyl-1,5-diaminopentane.

16. The composition of claim 14 wherein X represents a group obtained by removing the amino groups from 2-methyl-1,5-diaminopentane.

17. The composition of claim 13 wherein the proportions of components a) and b) are calculated to provide an equivalent ratio of isocyanate groups of component a) to isocyanate-reactive groups of component b) of about 0.8:1 to 2:1.

18. The composition of claim 13 wherein component c) comprises an aliphatic acid containing 2 to 12 carbon atoms.

19. The composition of claim 14 wherein component c) comprises an aliphatic acid containing 2 to 12 carbon atoms.

* * * * *